April 28, 1970   J. PICKLES ET AL   3,508,294
RECLINING SEAT MECHANISM ASSEMBLY
Filed Dec. 6, 1967   3 Sheets-Sheet 1
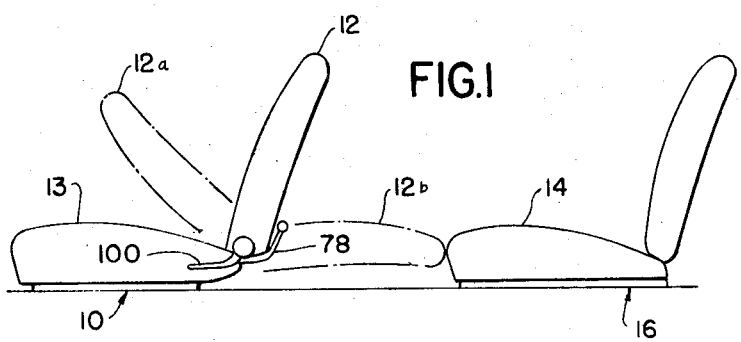
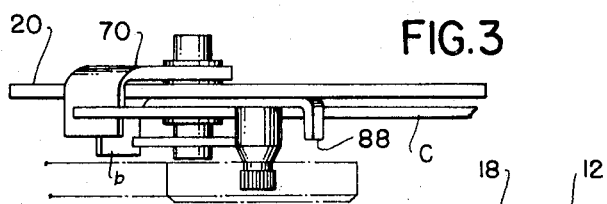
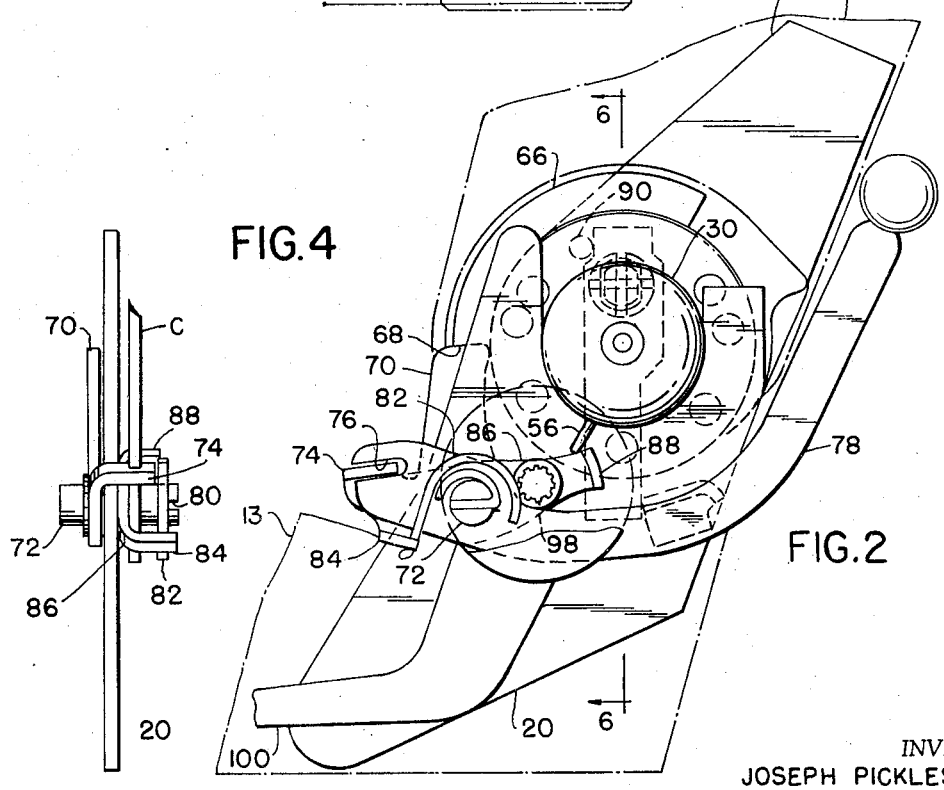
INVENTORS
JOSEPH PICKLES
CHESTER S. FUDALA
BY *Whittemore, Hulbert & Belknap*
ATTORNEYS April 28, 1970   J. PICKLES ET AL   3,508,294
RECLINING SEAT MECHANISM ASSEMBLY
Filed Dec. 6, 1967   3 Sheets-Sheet 2

INVENTORS
JOSEPH PICKLES
CHESTER S. FUDALA
BY *Whittemore,*
*Hulbert & Belknap*
ATTORNEYS

INVENTORS
JOSEPH PICKLES
CHESTER S. FUDALA

BY *Whittemore,*
*Hulbert & Belknap*
ATTORNEYS

United States Patent Office 3,508,294
Patented Apr. 28, 1970

3,508,294
RECLINING SEAT MECHANISM ASSEMBLY
Joseph Pickles, Bloomfield Hills, and Chester S. Fudala, Detroit, Mich., assignors to Ferro Manufacturing Corporation, Detroit, Mich., a corporation of Michigan
Filed Dec. 6, 1967, Ser. No. 688,380
Int. Cl. E05d 11/08, 11/10
U.S. Cl. 16—140               10 Claims

ABSTRACT OF THE DISCLOSURE

Reclining seat mechanism including gearing and a combined friction and locking spring mechanism providing for free movement of the seat forwardly from an upright position, and controlled movement of the seat back rearwardly to a full reclining position, the spring and gear serving to lock the seat back against rearward movement from any intermediate position while permitting forward movement thereof to upright position by releasing the lock or by pushing the seat back forwardly without release of the lock.

CROSS-REFERENCE TO RELATED APPLICATION

This application is related to earlier copending Pickles application Ser. No. 519,740, filed Jan. 10, 1966, now patent 3,423,785 assigned to the assignee of the present application.

BACKGROUND OF THE INVENTION

The production of reclining seats or semi-reclining seats has developed to a stage where seat backs may be moved to a full reclining position for the comfort of the occupant, moved to a forward position to provide clearance for exit from the back seat of a motor vehicle, and means have been provided for locking the seat in adjusted position. The present invention relates to an improvement in the particular mechanism for controlling the adjustment and movement of the seat.

SUMMARY OF THE INVENTION

In accordance with the present invention a friction drum is provided which is connected to a hinge assembly by gearing, preferably epicyclic gearing, which imparts relatively rapid rotation to the drum on relatively slow movement of the seat back. A helical spring is provided which is stressed to be in frictional contact with the drum to oppose movement thereof in one direction with a predetermined frictional resistance. However, movement of the drum in the opposite direction causes the spring to wind up tightly on the drum and to provide a firm lock effectively preventing movement of the seat back. The construction is arranged so that a manual operating lever must be operated to release the seat back for rearward movement. Torsion means are provided urging the seat back forwardly but with a force insufficient to overcome the frictional drag of the helical friction spring on the drum. Thus, the seat back may be pressed forwardly without release of the lever, as for example by the occupant of a rear seat, or the occupant of a seat to the rear such as may be the situation in multiple seating arrangements such as aircraft. The torsion spring means however, is effective to cause the seat back to move forwardly when the friction spring lock is released. A rigid abutment means prevents forward movement of the seat beyond its normal upright position but manually operated means are provided for disengaging the abutment means and releasing the friction spring lock to permit the seat to be moved forwardly from its upright position.

It is accordingly an object of the present invention to provide improved mechanism to carry out the operations and functions described in the foregoing.

Other objects and features of the invention will become apparent as the description proceeds, especially when taken in conjunction with the accompanying drawings, illustrating preferred embodiments of the invention.

BRIEF DESCRIPTION OF THE DRAWINGS

FIGURE 1 is a diagrammatic elevational view of two seats showing the seat back of the forward seat in different positions.

FIGURE 2 is an elevational view of a hinge assembly embodying the friction and lock mechanism as described.

FIGURE 3 is a fragmentary plan view of the mechanism shown in FIGURE 2.

FIGURE 4 is a fragmentary front elevational view of the mechanism shown in FIGURE 2.

DESCRIPTION OF THE PREFERRED EMBODIMENTS

Figure 5:
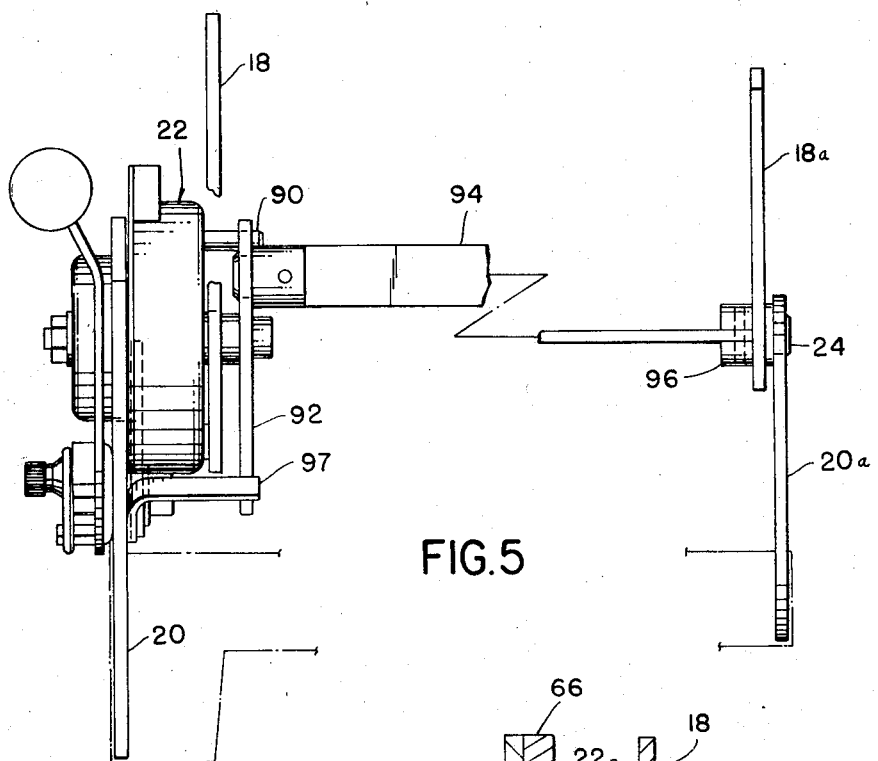
FIGURE 5 is a front elevational view showing the hinge devices at opposite sides of the vehicle seat.

Referring first to FIGURE 1 there is shown a front seat 10 having a seat back 12 adapted to be moved from the upright position shown in full lines to a forwardly inclined position 12a, or to a generally horizontally extending rearward position 12b. It will of course be understood that the seat back may assume any position intermediate the positions shown at 12 and 12b relative to the horizontal seat structure 13 for the comfort of the occupant. It will further be noted that when the seat back 12 is in its fully extended rearward position it is associated with the seat cushion 14 of a rear seat 16 so as to provide in effect a continuous support similar to a bed.

The seat back 12 has rigidly associated therewith a bracket 18 which is fixedly attached to the housing structure of the spring and gear operated hinge, as will subsequently be described. Fixedly associated with the horizontal seat portion 13 is a bracket 20 fixedly attached to a second portion of the housing which is rotatable with respect to the first portion as will subsequently be described.

As best seen in FIGURE 5, there is a combined spring and gear mechanism included in a housing indicated generally at 22, which constitutes one hinge connection between the seat and the seat back, or more properly, between the brackets 18 and 20 thereof. At the opposite end of the seat and constituting the second hinge support are similar brackets designated 18a and 20a which are hinged together by hinge mechanism indicated generally at 24.

Figure 6:
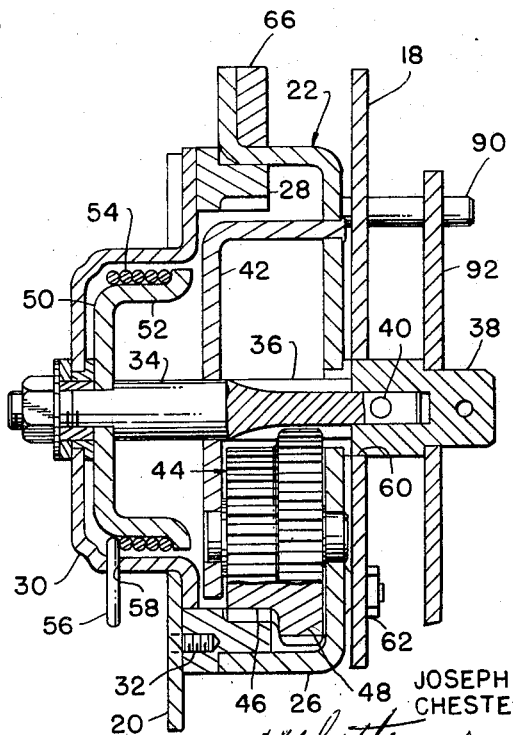
FIGURE 6 is a sectional view on the line 6—6, FIGURE 2.

Referring now more particularly to FIGURE 6, the gear and spring mechanism included in the housing 22 will be described. The housing comprises a cup-shaped housing 26 open at one end into which extends an annular internal gear 28 fixedly secured to a spring housing cup 30. The stationary bracket 20 is fastened by assembly screws 32 to the internal gear and spring housing cup 30. Extending through the spring housing cup 30 and the cup-shaped housing 26 is a shaft 34. Within the housing 26 the shaft 34 is provided with pinion teeth 36 for a purpose which will presently appear. The shaft extends outwardly beyond the housing where it is received in a pivot cap 38, the cap being doweled to the shaft as indicated at 40. Located in the housing 26 is a gear retainer bracket 42. Intermediate the bracket 42 and the bottom wall of the housing 26 are pivoted a plurality, as for example three, compound pinions indicated generally at 44. The pinions comprise reduced portions 46 which are in mesh with the teeth of the internal gear 28, and somewhat larger portions 48 which are in mesh with the teeth 36 provided on the shaft 34.

Located within the cup 30 is a spring brake drum 50, the drum having a non-circular opening fitting with a flattened portion of the shaft 34 as shown, so that the brake drum is rotatable with the shaft. The brake drum includes a cylindrical portion 52 around which is wound a coil spring 54 having one end 56 turned outwardly to extend through an elongated opening 58 formed in the cup 30. The other end of the spring 54 is fixed to cup 30.

The spring is initially wound to a diameter somewhat smaller than the diameter of the cylindrical brake portion 52 so that when the spring is forced onto the brake drum it is in substantial frictional contact therewith. If forces are applied to the brake drum rotating it in the direction which tends to cause the spring to wind more tightly on the brake drum, the spring constitutes an effective lock which becomes operative upon extremely limited rotation of the drum and which is effective to positively prevent rotation of the drum in the aforesaid direction. If however, forces are applied tending to rotate the drum in the opposite direction; that is, in the direction which tends to unwind the spring, the spring exerts a frictional drag which may be of rather precisely predetermined value.

The hinge bracket 18 which is fixed to and movable with the seat back, has an opening 60 therein fitting over the pivot cap 38 which thus constitutes a pivot support for the seat back. The bracket 18 is further fixed to the housing 26 by rigid fastennig elements 62.

From the foregoing it will be apparent that as the seat back is moved relative to the seat, the bracket 18 imparts rotational movement to the housing 26 relative to the stationary closure structure including the annular gear 28 and the cup 30. This movement of the housing 26 carries the compound gears 44 around the axis of the shaft 34. The meshing engagement between the smaller pinion portions 46 and the internal gear 28 results in rotation of the compound gears 44, and the larger portions 48 thereof being in mesh with the pinion teeth 36, results in relatively rapid rotation of the brake drum 52. Accordingly, relatively small forces applied to the brake drum 52 are effective to exert substantial frictional drag in one direction, or to effect positive lock in the other direction of rotation. Similarly, the locking action is initiated upon extremely small movement of the seat back 12 because of the relatively great multiplication of movement imparted to the shaft 34 by reason of the planetary gearing just described.

Referring now more particularly to FIGURES 2–4 there is shown the operator control mechanism associated with the spring and gear device. In the first place, attention is called to a radial projection 66 on the housing 26, this projection having an abutment end or shoulder indicated at 68. This shoulder is engaged by an arm 70 pivoted on a pin 72, the arm having an end portion engageable with the shoulder 68 to prevent inadvertent forward movement of the seat from its normal upright position. The arm 70 has a laterally bent finger 74 which is received in a slot 76 formed at one end of an operating lever 78 which is also pivoted on the pin 72. The pin 72 is slotted as indicated at 80 and received one end of a biasing spring 82, the other end engaging a laterally extending finger 84 formed on a second lever 86 also pivoted on the pin 72 and having a second finger 88 adapted to engage the portion 56 of the spring 58 which extends out of the cup 30.

Figure 7:
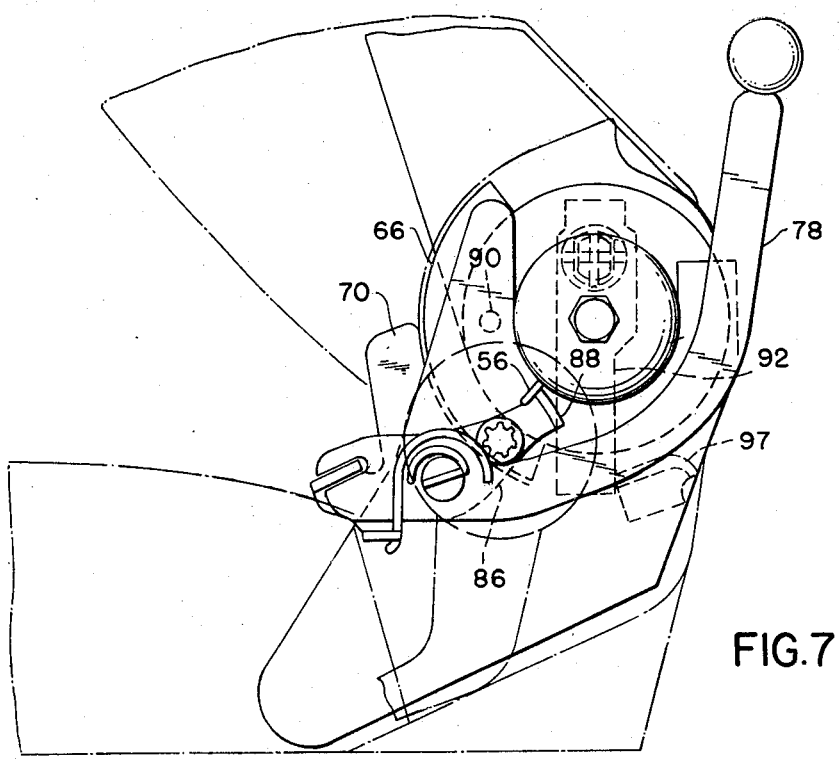
FIGURE 7 is a view similar to FIGURE 2 showing the seat back in its forward inclined position.

With the parts just described, the bias spring 82 biases the lever 86 into engagement with the underside of the finger 74 and hence, biases the lever 78 and the arm 70 in a clockwise direction as shown in FIGURE 2. When the operator decides to move the seat to the forwardly inclined position illustrated in FIGURE 7, the lever 78 is lifted as shown, moving the arm 70 to the left as seen in FIGURE 7 out of the path of movement of the radial projection 66. Further upward movement of the lever 78 causes it to engage the finger 88 on the lever 86 and to move the lever 86 into engagement with the end 56 of the friction and brake spring 54 and to move this end of the spring in a direction releasing the spring to permit manual movement of the seat back 12 to a forward position. It will be observed in FIGURE 7 that the arm 70 during this movement, simply rides upon the outer surface of the radial projection 66. When the seat is moved rearwardly to the upright position the parts again assume the position illustrated in FIGURE 2.

At that time, it will be observed that the housing 26, which is rotatable with the seat back, carries an inwardly extending pin 90. This pin is associated with a lever 92 pivoted to the pivot cap 38. During forward movement of the seat from its upright position the pin 90 moves away from the upper end of the lever 92.

Figure 8:
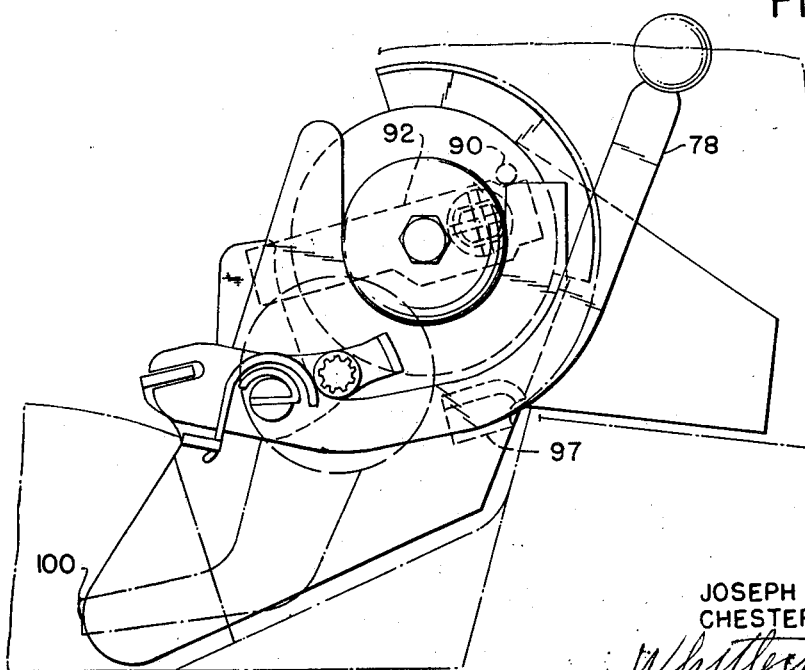
FIGURE 8 is a view similar to FIGURE 2 showing the seat back in its rearward inclined position.

Connected to the lever 92 is a torsion spring 94 the opposite end of which is fixedly mounted in the stationary torsion bar stud 96. When the seat back is moved rearwardly the pin 90, as best illustrated in FIGURE 8, swings the torsion spring lever 92 to the position shown, thus twisting the torsion bar 96 and establishing a resilient force tending to restore the seat back to its upright position. The force of the torsion spring however, is insufficient to overcome the friction drag imposed by the spring 54 so that the seat back will normally remain in whatever intermediate position it is left. However, the seat may be manually restored to the upright position by moderate forces applied directly to the seat back without operating release levers.

Upon reaching upright position, lever 92 engages a rigid stop 97, in the relationship best seen in FIGURES 5 and 7. Accordingly, torsion spring 94 does not act to urge the seat back forwardly beyond the upright position.

Referring again to FIGURE 4 it will be observed that the lever 86 which essentially serves to engage the end 56 of the friction and locking spring 54, carries a splined stud 98 which is adapted to receive a second release lever 100. Downward movement of the forwardly extending portion of the lever 100 results in counterclockwise movement of the lever 86 about the axis of the pin 72, thus releasing the friction and locking spring 54 in the same manner as when the lever 86 is actuated by movement of the manual control lever 78. At this time however, it is of course unnecessary to shift the arm 70 to inoperative position since the contemplated movement of the seat back at this time is rearwardly. With the lever 100 depressed the occupant moves the seat back to whatever intermediate position is desired, and then releases the lever 100. Release of the lever permits it to be restored to its inoperative position by the spring 82 and the seat back is at this time positively locked against further rearward movement. However, restoring movement of the seat back to its upright position is permitted since this movement is opposed only by friction drag of the spring 54. Also, the torque exerted by the torsion spring 94 is sufficient to move the seat back from its rearward extending position of any intermediate position to the full upright position whenever the lever 100 is operated to effect complete release of the friction drag imposed by the spring 54.

From the foregoing it will be observed that from the upright position, the seat may be moved freely to the forwardly extending position by upward movement of the lever 78, and restored to upright position. If it is decided to move the seat rearwardly from the upright position the operator depresses lever 100 and applies force directly to the seat back, moving it to the required position, at which time the lever 100 is released and the seat will remain in this position. The seat may not be moved further rearwardly by any forces imposed thereon without release of the lever 100. It may however, be moved forwardly against the friction drag imposed by the spring 54 without operation of the lever 100. In addition, if the lever 100 is operated to release the friction drag of the spring 54 while no forces are applied externally to the seat back, the torsion spring 94 is effective to restore the seat to its upright position.

The drawings and the foregoing specification constitute a description of the improved reclining seat mechanism assembly in such full, clear, concise and exact terms as to enable any person skilled in the art to practice the invention, the scope of which is indicated by the appended claims.

What we claim as our invention is:

1. A reclining seat mechanism assembly comprising a fixed member adapted to be connected to a seat and an angularly movable member adapted to be connected to a reclining seat back, a pivot shaft connecting said members, said members and pivot shaft constituting a hinge for connecting the seat back to the seat, epicyclic gearing connecting said members and shaft, manually releasable friction and lock means connected between one of said members and said shaft, rigid abutments on said members engageable upon movement of said seat back forwardly into upright position and operable to prevent forward movement of said seat back from said upright position, and selectively operable means to shift one of said abutments to a position in which it is out of the path of movement of said other abutment to provide for forward movement of the seat back from its upright position.

2. Mechanism as defined in claim 1 in which said selectively operable means comprises a single lever operable to release said friction and lock means and to shift said one abutment as aforesaid.

3. Mechanism as defined in claim 2 in which said friction and lock means comprises a drum rotatable with said shaft, a coil spring in frictional contact with said drum and wound in such a direction that forward movement of the seat back is frictionally opposed and rearward movement thereof winds up the spring to provide a positive lock against rearward movement of the seat back, said spring having a free end by means of which it may be slightly unwound to release the drum for free movement in either direction, said selectively operable means including means operable upon predetermined movement of said lever to engage the free end of said spring to release the seat back for free movement forwardly from upright position.

4. Mechanism as defined in claim 3 in which the means which engages the free end of said spring is operable only after movement of said lever has shifted the one abutment out of the path of the other.

5. Mechanism as defined in claim 3, said spring being adapted to oppose forward movement of the seat back with a predetermined frictional resistance, and second selectively operable manual means including a part engageable with the free end of said spring to release the friction and lock means to provide for adjustment of the seat back into any position between upright and full reclining position.

6. A reclining seat mechanism assembly comprising a fixed member adapted to be connected to a seat and an angularly movable member adapted to be connected to a reclining seat back, releasable means connected between said members and effective to lock said members to prevent rearward movement of the seat back and to oppose frictional resistance to forward movement of the seat back, said means including an element movably carried on said mechanism and operable when moved thereon to terminate both the locking and frictional functions of said means, abutments on said members normally engageable upon movement of said seat back forwardly into upright position to prevent forward movement of the seat back from upright position, and manually operable means for shifting one of said abutments to inoperative position.

7. Mechanism as defined in claim 6 comprising an arm pivotally connected to one of said members, resilient means connected to said arm urging it for movement in one direction, first abutment means between said arm and the other member to cause said resilient means to urge the seat back forwardly, second abutment means between said arm and the said other member to limit movement of said arm to the position which it reaches as the seat back is moved forwardly to upright position.

8. Mechanism as defined in claim 6 in which said manually operable means also includes means engageable with said element to release said releasable means.

9. Mechanism as defined in claim 8, said manually operable means comprising a first arm on which one of said abutments is provided, a second arm having thereon the said means engageable with said element, and a first control member connected to said first arm and engageable with said second arm upon predetermined movement thereof to shift the abutment on said first arm out of the path of said other abutment and thereafter release said releasable means.

10. Mechanism as defined in claim 9, and a second control member connected directly to said second arm for actuation thereof without operating said first arm.

References Cited

UNITED STATES PATENTS 3,206,248 9/1965 Dosh _____ 297—374
3,423,785 1/1969 Pickles _____ 16—140

BOBBY R. GAY, Primary Examiner

D. L. TROUTMAN, Assistant Examiner